United States Patent [19] [11] 4,200,881
Carnt et al. [45] Apr. 29, 1980

[54] ENCODING AND TRANSCODING APPARATUS FOR VIDEO DISC SYSTEMS

[75] Inventors: Peter S. Carnt, Neerach; Ernst A. O. Rutishauser, Widen; Jorg Schiess, Stallikon, all of Switzerland

[73] Assignee: RCA Corporation, New York, N.Y.

[21] Appl. No.: 822,659

[22] Filed: Aug. 8, 1977

[30] Foreign Application Priority Data

Aug. 9, 1976 [GB] United Kingdom ............... 33120/76

[51] Int. Cl.² ...................... H04N 5/79; H04N 9/46; H04N 9/02
[52] U.S. Cl. ........................................ 358/4; 358/16; 358/19; 358/31
[58] Field of Search ..................... 358/4, 8, 11, 31, 16, 358/19

[56] References Cited

U.S. PATENT DOCUMENTS

| 3,674,920 | 7/1972 | Faroudja | 358/31 |
| 3,845,237 | 10/1974 | Yamanaka | 358/4 |
| 3,872,498 | 3/1975 | Pritchard | 358/4 |
| 3,911,476 | 10/1975 | Keizer | 358/4 |
| 3,969,757 | 7/1976 | Amery | 358/8 |
| 4,001,876 | 1/1977 | Schiess | 358/8 |
| 4,005,473 | 1/1977 | Hjortzberg | 358/4 |
| 4,051,517 | 9/1977 | Hjortzberg | 358/4 |

FOREIGN PATENT DOCUMENTS

| 2304940 | 8/1974 | Fed. Rep. of Germany . |
| 2461704 | 7/1975 | Fed. Rep. of Germany . |
| 2546378 | 4/1976 | Fed. Rep. of Germany . |
| 2615451 | 11/1976 | Fed. Rep. of Germany . |
| 2616140 | 11/1976 | Fed. Rep. of Germany . |
| 1540871 | 2/1979 | United Kingdom . |

OTHER PUBLICATIONS

Bruch, "Transcoder PAL-NTSC . . .", Telefunken-Zeitung, Jg. 37 (1964), Heftz, pp. 115-134.
Carnt et al., Colour Television, vol. 2, 1969, Iliffe Books, Ltd., London, England, pp. 27-31 and 47-53.

Primary Examiner—John C. Martin
Attorney, Agent, or Firm—Eugene M. Whitacre; William H. Meagher

[57] ABSTRACT

Color encoding format for a color picture information record, and recording apparatus therefor, are disclosed for recording of discs for use with both (1) disc players designed to provide PAL-type outputs for driving PAL-type color television receivers, and (2) disc players designed to provide SECAM-type outputs for driving SECAM-type color television receivers. In players, up-conversion of recovered composite signal precedes comb filtering to separate luminance and chrominance components. Decoding of up-converted chrominance component, to obtain baseband color-difference signal information is followed by remodulation of a carrier pursuant to a desired output format. Comb filter arrangements of U.S. Pat. No. 3,969,757 are used when up-conversion shifts color subcarrier to a frequency in vicinity of PAL subcarrier frequency, but bearing odd integral multiple relationship to half the line frequency. Differing comb filter arrangements are employed when up-conversion shifts color subcarrier to PAL subcarrier frequency. Demodulation/remodulation arrangement involving the separate detection and remodulation use of two color-difference signals, as well as system requiring detection and remodulation use of only one color-difference signal, are disclosed.

15 Claims, 7 Drawing Figures

ENCODING AND TRANSCODING APPARATUS FOR VIDEO DISC SYSTEMS

The present invention relates generally to video disc record systems and particularly to color picture information records, to apparatus and methods for use in the recording of color picture information to obtain such records, and to playback apparatus for use in recovering information from such records, which are compatible with the convenient delivery of recorded information to color television receivers of the PAL or SECAM type for display of the recorded information.

In various systems currently employed for storing color picture information in the track of a disc record, effective bandwidth limitations militate against recording color television signals in encoding formats of standard NTSC, PAL, or SECAM type. In U.S. Pat. No. 3,872,498 - Pritchard, a non-standard color television signal encoding format of a so-called "buried subcarrier" form is disclosed as particularly advantageous for video disc recording purposes. In the buried subcarrier format, the chrominance signal falls in a midband portion (e.g., 1-2 MHz.) of the luminance signal. Comb filtering of the luminance signal prior to combination with the chrominance signal prepares signal-free troughs in the midband portion of the luminance signal, while comb filtering of the chrominance signal prior to the combination substantially confines the chrominance signal components to the aforesaid trough regions.

In illustrative applications of the buried subcarrier approach, as disclosed in U.S. Pat. No. 3,872,498, the color encoding employed with the buried subcarrier is akin to NTSC encoding in (1) employing a subcarrier frequency choice substantially corresponding to an odd multiple of half the line frequency (whereby there is a half-line frequency offset between the luminance and buried subcarrier sideband spectra), and (2) forming the modulated subcarrier by summing (a) the resultant of modulating a first subcarrier component of a first constant phase with a first color-difference signal, such as R-Y, with (b) the resultant of modulating a second subcarrier component of a second constant phase (in quadrature relation to the first constant phase) with a second color-difference signal, such as B-Y (with the consequence that there is only a phase offset between the two subcarrier components).

When color encoding of the above-described type is employed with the buried subcarrier approach in preparation of a recording signal, the subsequent separation of the luminance and chrominance components of the buried subcarrier signal, upon playback of the disc recording, is facilitated. The separation may be effected, for example, through use of a comb filtering system of a type employing a single 1H delay line, such as shown for example, in U.S. Pat. No. 3,969,757.

In contrast, when color encoding of a PAL type (involving line-by-line alternation of one subcarrier component) is employed with the buried subcarrier approach in preparation of a recording signal, the subsequent separation of luminance and chrominance components of the buried subcarrier, upon playback of the disc recording, is not facilitated. That is, with subcarrier frequency chosen, in the PAL fashion, to substantially correspond to an odd multiple of one-quarter of the line frequency, the recorded signal would have only a quarter-line frequency offset between the luminance and buried subcarrier sideband spectra. With such an offset, adequate separation of luminance and buried subcarrier sideband components in playback operations cannot be achieved with comb filters of a simple type employing a single 1H delay line. Moreover, the dot pattern associated with display of any residual buried subcarrier components of a PAL type of buried subcarrier signal is more objectionable than the dot pattern associated with a half-line frequency offset buried subcarrier signal of the previously mentioned non-PAL type disclosed in U.S. Pat. No. 3,872,498.

Use of color encoding in a SECAM fashion is not feasible with the buried subcarrier approach, since the varying frequency spacing between FM subcarrier components and the luminance spectra effectively preclude use of the desired comb filter actions in recording signal formation and playback signal processing.

In the light of the foregoing observations, it is herein proposed that a color encoding format, employing the buried subcarrier approach of U.S. Pat. No. 3,872,498, with (1) a substantially half-line frequency offset between luminance and buried subcarrier sideband spectra, and (2) with only a phase offset between the respective pair of subcarrier components, should be employed in the recording of discs for use with both (1) disc players designed to provide PAL-type outputs for driving PAL-type color television receivers, and (2) disc players designed to provide SECAM-type outputs for driving SECAM-type color television receivers.

It is further proposed that the precise frequency choice for the buried subcarrier employed in recording signal formation differ slightly from an odd integral multiple of half the line frequency, with the slight difference corresponding substantially to half the field frequency. This difference is so slight that it has not significant adverse effect on the accuracy of component separation achieved with comb filters employing 1H delay lines. However, the imposition of this additional half-field frequency offset can provide a desirable result of effectively lessening the visibility of a dot pattern produced by display of residual buried subcarrier components through alteration of the appearance of the pattern crawl. An illustrative choice for the buried subcarrier frequency, pursuant to the principles of the present invention, is 1,476,587.5 Hz, corresponding to the sum of (a) one-half a field frequency of 50 Hz, and (b) 189 times one-half of a line frequency of 15,626 Hz.

In the standard NTSC signal, the modulated color subcarrier waves are accompanied by color synchronizing information in the form of periodic bursts of color subcarrier frequency waves of constant amplitude and constant phase, each burst occurring during the "back-porch" interval following a horizontal synchronizing pulse and having a $-(B-Y)$ phase, 180° away from the phase of the subcarrier component subject to modulation of $+(B-Y)$ color difference signals. In the standard PAL signal, color synchronizing bursts are also provided during such backporch interval; the PAL burst, however, is subject to a line-by-line alternation of its phasing between a phase lagging the $-(B-Y)$ phase by 45°, and a phase leading the $-(B-Y)$ phase by 45°. For the recording purposes of the present invention, it is proposed that the modulated buried subcarrier waves should be accompanied by color synchronizing bursts of buried subcarrier frequency, which are akin to the standard NTSC bursts in having phase constancy (free from the line-by-line phase changes of the PAL "swinging burst"), but differing from the standard NTSC bursts in that the constant phase of the bursts differs from the —(B-Y) phase by 45°. The sense of the 45° difference is desirably such that it corresponds to the phasing of the resultant of summing equal amplitude buried subcarrier components of +(R-Y) and —(B-Y) phasing, respectively. As will be explained subsequently, the use of the above-described form for the buried subcarrier bursts facilitates a subsequent transformation of the buried subcarrier signal (e.g., in a disc player) to a form suitable for driving PAL-type color television receivers (without disturbance to an alternative transformation of the buried subcarrier signal to a form suitable for driving SECAM-type color television receivers).

The standard PAL signal has a "meandering" burst blanking during successive vertical blanking intervals, which is such that the last and first bursts of each field have the same phase. The burst blanking is effected within a period having a width of 9 lines, which period effectively advances in half-line steps, when the field order is taken as 4, 1, 2, 3 (as illustrated, for example, on page 30 of the Carnt-Townsend book, entitled "Colour Television - Volume 2", and published in 1969 by Iliffe Books, Ltd., London, England). For the recording signal formation purposes of the present invention, the buried subcarrier burst blanking is desirably effected with a similar form of "meander" (i.e., effected within a period having a width of 9 lines, which period effectively advances in half-line steps, when the field order is taken as 4, 1, 2, 3, as shown in the aforesaid book), even though all of the buried subcarrier bursts are of the same phase. The presence of the aforesaid meander of the buried subcarrier burst blanking period facilitates a subsequent player transformationn of the buried subcarrier signal to a form capable of driving a PAL-type color television receiver with minimum disturbance of the receiver's reference carrier generator at each field beginning (without adverse effect on an alternative transformation of the buried subcarrier signal to a form suitable for driving a SECAM-type color television receiver).

In an illustrative example of use of the buried subcarrier signal described hereinabove, the color-difference modulating signals have a bandwidth of 0–500 KHz., whereby the spectrum occupied by the sidebands of the buried subcarrier corresponds to 1.4765875 MHz. ±500 KHz. (or approximately 1-2 MHz.). Illustratively, the accompanying luminance signal component is restricted to a bandwidth of 0–3 MHz. As in U.S. Pat. No. 3,872,498, prior to addition with the buried subcarrier sideband components, the luminance signal component is subject to combing, at least in the to-be-shared midband region (eg., 1-2 MHz.), to prepare signal-free spectrum troughs for buried subcarrier sideband component occupancy. While the luminance component combing may extend beyond the midband boundaries, it is desirable that a low frequency portion (e.g., 0–900 KHz.) remain effectively uncombed, so as to permit retention in the recorded luminance signal of "vertical detail" information. The modulated color subcarrier waves are also subject to combing prior to addition with the luminance signal so as to substantially confine the buried subcarrier sideband components to the aforementioned trough regions. In a copending British patent application, Ser. No. 33,118/76, a description is provided of an advantageous form of transcoding apparatus which may be employed to transform a standard PAL signal into a buried subcarrier signal of the form described hereinabove.

In playback apparatus for records of the type herein described, transcoding is effected to convert a recorded buried subcarrier signal into a PAL-type signal suitable for application to a conventional PAL color television receiver, or into a SECAM-type signal suitable for application to a SECAM-type color television receiver. Pursuant to advantageous playback aspects of the present invention, the player's transcoding arrangement desirably involves a decoding of modulated subcarrier waves recovered from the record to obtain baseband color-difference signal information, followed by remodulation of a carrier pursuant to a desired output format. The player's transcoding arrangement incorporates comb filters for separation of the luminance and chrominance components of the signal recovered from the record, with an upconversion of the recovered signal preceding comb filtering. Pursuant to one illustrative player embodiment, the up-conversion shifts the color subcarrier from its buried subcarrier value to a frequency, in the vicinity of the standard PAL subcarrier frequency, but bearing an odd integral multiple relationship to half the line frequency. With such a form of up-conversion direct adoption of the comb filter forms shown in the aforementioned U.S. Pat. No. 3,969,757 is convenient. In alternative illustrative player embodiments, the up-conversion shifts the color subcarrier to the standard PAL subcarrier frequency (which does not bear the aforesaid relationship to half the line frequency). With use of the latter form of up-conversion, departures from the comb filter forms of the aforesaid U.S. Pat. No. 3,969,757 are desirably employed to obtain satisfactory component separation.

In several player embodiments disclosed herein, the demodulation/remodulation functions involve the separate detection (and remodulation use) of two color-difference signals. An arrangement, requiring detection of only one color-difference signal, is also disclosed, however, for alternative use when a PAL-type output from the player is desired.

Figures 1, 1A:
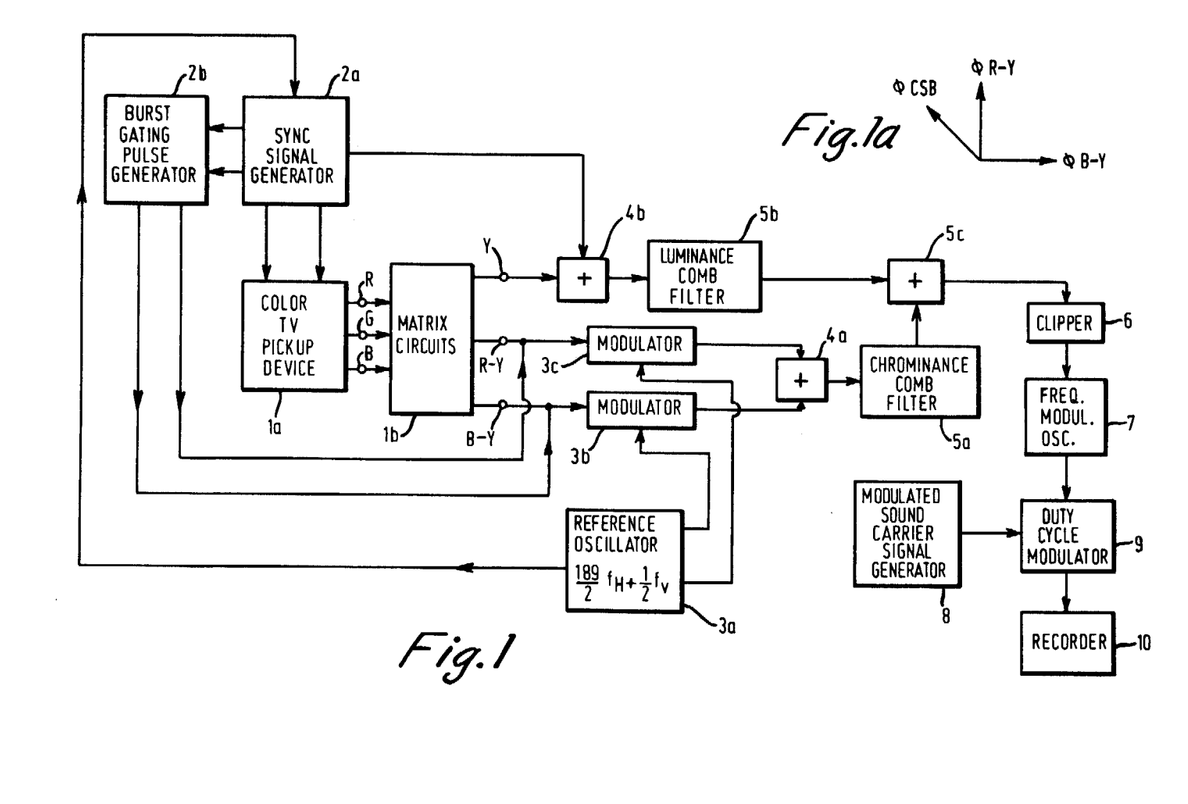
FIG. 1 provides a block diagram illustration of recording apparatus suitable for use in formation of color picture information records pursuant to the principles of the present invention.
FIG. 1a illustrates graphically a vector diagram of aid in explaining the operation of the apparatus of FIG. 1.

In FIG. 1, a color television pickup device 1a (which may, for example, be a film scanning camera) develops a trio of color signal outputs, representative of the red, blue and green color components of a color picture, at terminals R, B and G. The color signals at terminals R, B and G are supplied to matrix circuits 1b for combination therein to develop as outputs: a luminance signal at terminal Y; a red color-difference signal at terminal R-Y, and a blue color-difference at terminal B-Y. Illustratively, the matrix circuits 1b include suitable frequency selective networks for establishing desired passbands for the respective outputs (e.g., 0–3 MHz. for the luminance signal, and 0–500 KHz. for the respective color-difference signals.

The luminance signal output of matrix circuits 1b is supplied to an adder 4b for combination with conventional deflection synchronizing waveforms developed by a sync generator 2a (also supplying appropriate deflection control signals at line frequency $f_H$ and field frequency $f_V$ to the pickup device 1a). The respective blue and red color-difference signal outputs of matrix circuits 1b form the modulating signal inputs to a pair of modulators 3b and 3c, also receiving respective carrier wave outputs of an oscillator 3a. The outputs of the modulators 3b and 3c (illustratively confined within frequency limits corresponding to the carrier wave frequency ±500 KHz.) are combined in an adder 4a to form a chrominance signal. The frequency of the carrier wave outputs of oscillator 3a substantially corresponds to an odd integral multiple of half the line frequency ($f_H$), but desirably differs slightly therefrom by an amount corresponding to half the field frequency ($f_V$), for previously discussed pattern visibility reduction reasons. Illustratively, the precise frequency of the oscillator outputs is 1.4765875 MHz., corresponding to the sum of (a) 189 times one-half of the line frequency ($f_H$) and (b) one-half of the field frequency ($f_V$), where $f_H$=15,625 Hz. and $f_V$=50 Hz. A coupling of an output of oscillator 3a to the sync signal generator 2a is desirably provided to ensure maintenance of the desired frequency relationships.

The phase ($\phi_{B-Y}$) of the carrier wave input to the B-Y modulator 3b leads the phase ($\phi_{R-Y}$) of the carrier wave input to the R-Y modulator 3c by 90°, as indicated in the vector diagram of FIG. 1a. To effect development of a color synchronizing burst, the respective modulators 3b and 3c also receive respective bursts gating pulse inputs developed by a burst gating pulse generator 2b, with the respective gating pulses of comparable amplitude but opposite polarity, selected so that the phase ($\phi_{CSB}$) of the resultant color synchronizing burst appearing in the output of adder 4a lags $\phi_{R-Y}$ by 45° (as shown in the vector diagram of FIG. 1a).

The burst gating pulse generator 2b is controlled in response to outputs of the sync signal generator 2a so that a "meandering" burst blanking is effected during successive vertical blanking intervals. The control is such that a burst blanking period having a width of 9 line intervals (during which period burst gating pulse application to the modulators is precluded) advances in half-line interval steps (when the field order is taken as 4, 1, 2, 3, as discussed for PAL meander control in the aforementioned Carnt, et al book).

The chrominance signal output of adder 4a is applied to a chrominance comb filter 5a, while the luminance signal output of adder 4b is applied to a luminance comb filter 5b. The frequency response characteristic of the chrominance comb filter 5a exhibits a plurality of rejection notches at even integral multiples of half the line frequency, whereas the frequency response characteristic of the luminance comb filter 5b exhibits a plurality of rejection notches at odd integral multiples of half the line frequency. However, to avoid "vertical detail" information, the characteristic of the luminance comb filter 5b, over a portion (e.g., 0–900 KHz.) of the low frequency band (below the lowest chrominance subcarrier sideband frequency), is modified to exhibit a substantially flat response. Suitable arrangements for realizing such comb filters are presented in the aforementioned U.S. Pat. No. 3,872,498.

The outputs of the filters 5a and 5b are combined in adder 5c to form a composite color video signal of the advantageous form described hereinabove. In an illustrative use of this composite color video signal for recording purposes, following the recording approach generally described in U.S. Pat. No. 3,911,476, the output of adder 5c is utilized to vary the output frequency of a frequency modulated oscillator 7. To limit the deviation range of the resultant FM signal to a desired band (e.g., 4.3 MHz to 6.3 MHz), the composite signal is subject to double-ended amplitude limiting in a clipper 6, prior to application to the frequency modulated oscillator 7. In order to supplement the color picture information with accompanying sound information, the FM signal output of oscillator 7 is subject to duty cycle modulation, in a duty cycle modulator 9, in response to the output of a modulated sound carrier signal generator 8, as in the manner described, for example, in said U.S. Pat. No. 3,911,476. The output of the duty cycle modulator 9 serves as a recording signal input to a disc recorder 10, which, illustratively, may be of an electron beam type, such as the recorders described in U.S. Pat. No. 3,943,275 or U.S. Pat. No. 3,997,807, or of an electromechanical type, such as the recorders described in U.S. Pat. No. 3,865,997 or U.S. Pat. No. 4,035,590.

Upon completion of the recording process (including a suitable developing action, in the instance of electron beam recording) a spiral information track is formed in a disc surface which comprises a series of depressions with a periodicity which varies in accordance with the novel composite color video signal described hereinabove. When the aforementioned duty cycle modulation approach is employed, the accompanying modulated sound carrier information is represented by a variation in the duty cycle of the successive depressions. Other parameters of the depressions, instead of said duty cycle, may alternatively be varied for sound information representation; e.g., variation of the depth of the depressions may be effected, as described in the aforementioned U.S. Pat. No. 4,035,590.

FIG. 1, as described above, provides an illustration of apparatus for developing a novel composite color video signal, of a form suitable for recording signal formation purposes of the present invention, from a set of red, green and blue component color signals. In a copending British patent application, Ser. No. 33,118/76 (and a counterpart, copending U.S. patent application, Ser. No. 808,295), apparatus is described for forming such a composite color video signal via the transcoding of composite color video signals existing in a standard PAL format.

Three arrangements (illustrated in the accompanying FIGS. 2, 3 and 4, respectively) will now be described, each of which may serve in video disc player apparatus to convert a recorded buried subcarrier signal (of the novel type described hereinabove) into a PAL-type signal suitable for application to a conventional PAL color television receiver, or into a SECAM-type signal suitable for application to a SECAM-type color television receiver. Illustratively, the player apparatus may be of a general type described in the previously mentioned U.S. Pat. No. 3,911,476, with a capacitance variation sensing pickup cooperating with suitable FM demodulation apparatus to enable recovery of the recorded composite color video signals.

Each of these three arrangements involves a decoding of modulated buried subcarrier waves to obtain baseband color difference signals, followed by use of the recovered color difference signals to remodulate carrier components according to a desired standard. This scheme has the advantage of flexibility in that the ultimate signal can be chosen as PAL or SECAM, simply by introduction of the appropriate remodulation circuitry. Thus, a common player design may be employed for both PAL-output and SECAM-output players, with differences therebetween centered predominately on the remodulation circuitry. If desired, a dual standard player may be provided with both forms of remodulation circuitry, subject to switch selection according to the output standard desired. Alternative approaches, involving transcoding methods employing a modifier, where the chroma signal is not reduced to baseband, would be feasible only where the ultimate signal desired was of the PAL type.

Figure 2:
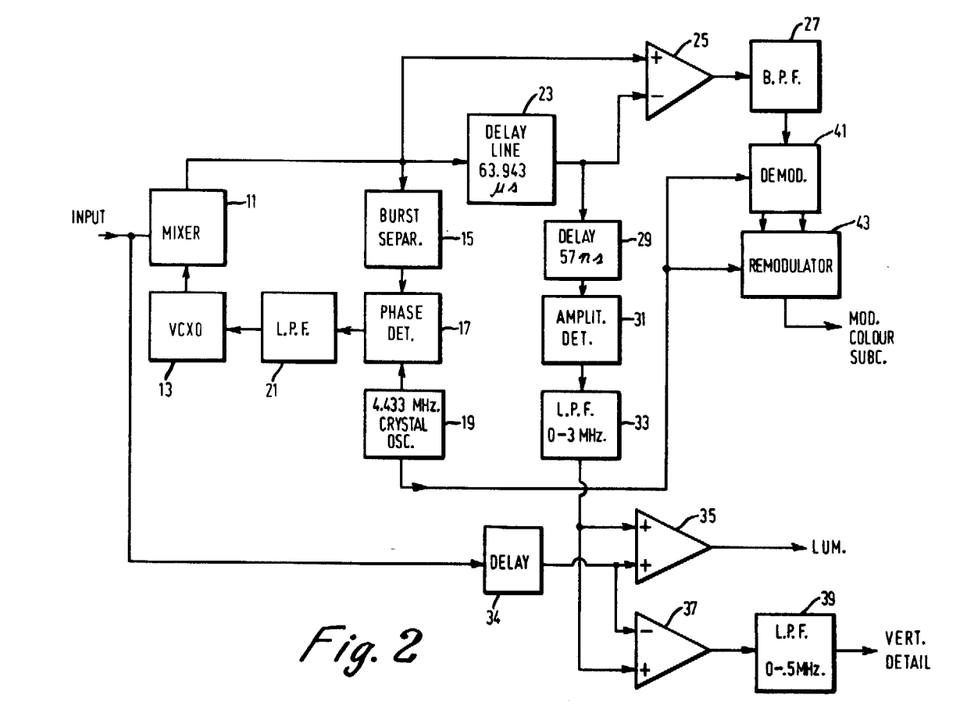
FIGS. 2, 3, and 4 provide respective block diagram illustrations of different embodiments of transcoding apparatus suitable for use in equipment providing playback of records, such as those recorded by the apparatus of FIG. 1, pursuant to principles of the present invention.

The first arrangement is shown in block form in FIG. 2. A composite color video signal of the buried subcarrier type herein described, derived by playback of a video disc and appearing at input terminal A, is up-converted in frequency by an amount chosen so that the subcarrier frequency of the recorded signal, which is nominally 1.4765875 MHz (hereinafter referred to as 1.48 MHz, for convenience), is shifted to the standard PAL subcarrier frequency 4.43361875 MHz. (hereinafter referred to as 4.433 MHz. for convenience). This is achieved in mixer 11 by mixing the input signal from terminal A with the output of a voltage controlled oscillator (VCXO 13), having an output frequency corresponding to the sum of the buried subcarrier and PAL subcarrier frequencies, or about 5.91 MHz. The color synchronizing bursts of the up-converted signal, separated by burst separator 15, are compared, in a phase detector 17, with reference waves of PAL subcarrier frequency supplied by a crystal oscillator 19. The phase detector output is filtered by low pass filter 21 to develop an error signal which controls the VCXO output frequency in a sense opposing departures from frequency and phase synchronsim between the separated bursts and the output of oscillator 19. Thus, any time base instabilities in the disc signal are followed by the output of the VCXO 13 in a manner resulting in a stable 4.433 MHz. color subcarrier and sideband components. In the up-converted signal, high frequency luminance components continue to share a band region with the color subcarrier components, but now appear as sidebands of a carrier of 5.91 MHz. The original $f_{H/2}$ offset, which existed between the subcarrier and luminance spectra in the recorded signal, is still maintained in the up-converted signal, though the color subcarrier and each of its sideband components now has an absolute value which substantially corresponds to the sum of an integral multiple of the line frequency and 3 $f_{H/4}$ (neglecting the slight effects of the half field frequency offsets), while each luminance component (i.e., each luminance carrying sideband of the 5.91 MHz carrier) has an absolute value which substantially corresponds to the sum of an integral multiple of the line frequency and $f_{H/4}$.

It should be noted that the up-converted subcarrier sideband spectrum is of the same form as that of a standard PAL U signal, while the 5.91 MHz luminance sidebands have the same form as a standard PAL V signal. Therefore, in the same way that U and V subcarrier signals can be separated by a 63.943 μs comb filter in the conventional PAL case (as explained, for example, in Section 2.8.2 of the aforementioned Carnt-Townsend book) so here can the subcarrier sidebands and luminance sidebands be separated by an identical comb filter. The delay of 63.943 μs (less than a 1H period of 64 μs by an amount of 57 nanoseconds, which approximates a quarter cycle at 4.433 MHz) substantially ensures that an odd number of half cycles of the spectrum of the color subcarrier sidebands will be contained within the delay line, and an even number of half cycles of the luminance sideband spectrum having its carrier at 5.91 MHz will correspondingly be contained within the delay line. In the FIG. 2 arrangement, the output of mixer 11 is applied to a delay line 23 having a delay of 63.943 microseconds. A subtractive combiner 25, coupled to both input and output of delay line 23, forms the difference between direct and delayed signals. Filtering of the combiner output by bandpass filter 27 (e.g., passband equal to 4.433±0.5 /MHz.) yields the 4.433 MHz. subcarrier and its sidebands (substantially free of luminance components). The delay line 23 has sufficient bandwidth to accommodate requisite sidebands of all relevant components.

Because the delay of line 23 is not exactly 1H, the frequency response characteristic of a comb filter formed by summing the direct and 63.943 μs delayed signals will not have a $f_H$ spacing between successive rejection notches (or between successive response peaks), but rather a slightly smaller spacing. Thus, while the 4.433 MHz subcarrier location itself may match a rejection notch location, there will be a mismatch between subcarrier sideband component locations and rejection notch locations. For subcarrier sidebands close to the subcarrier, the mismatch is slight, but as sideband separation from the subcarrier increases, the mismatch grows. A mismatch between luminance sideband component locations and the filter's response peaks also grows with the luminance sideband component separation from the 4.433 MHz subcarrier value. To avoid the mismatch effects (which are tolerated in the use of combiner 25 to obtain the modulated color subcarrier signal, in view of the relatively narrow bandwidth involved) over a relatively wideband, the luminance combing is not effected by simply summing the direct and 63.943 microsecond delayed signals. Instead, the output of delay line 23 is applied to a delay device 29, which provides an extra delay of 57 nanoseconds. The output of delay device 29 is applied to an amplitude detector 31, which effects demodulation of the 5.91 MHz carrier. The detector output is filtered by lowpass filter 33, having a cutoff at the maximum luminance component frequency (e.g., 3 MHz). The resulting (exactly 64 μs) delayed signal is then added to the input signal from terminal A in additive combiner 35 to form a luminance signal which has been combed free of color subcarrier sideband components. It will be seen that the mismatch effects have been avoided, but with the combing effectively carried out at baseband frequencies. A penalty is paid in using such baseband combing, in that the luminance combing is not time base stabilized, but this can be tolerably small effect, where the basic stability of the disc signal is reasonably good; e.g., ±2 KHz in 1.48 MHz (0.15%) which corresponds to a phase error of 0.15×360×10⁻², or about 0.5°, in the combing.

The difference between the input signal from terminal A and the delayed signal output of filter 33 is also formed by a subtractive combiner 37, with the combiner output supplied to a low pass filter 39 (with an illustrative passband of 0–0.5 MHz.) to obtain a signal representative of vertical detail information undesirably removed from the luminance signal by combing of its lowband region. When this vertical detail signal is subsequently combined with the output of combiner 35, the effect of combing in the 0–0.5 MHz. lowband region is overcome.

The modulated color subcarrier wave output of filter 27 is applied to demodulator apparatus 41, wherein synchronous detection of the modulated subcarrier waves, using reference waves (at the PAL subcarrier frequency) derived from the output of the reference oscillator 19, permits recovery of the individual color difference signals, R-Y and B-Y. The color difference signal outputs of the demodulator apparatus 41 are applied to remodulator apparatus 43, where they are utilized in the formation of modulated color subcarrier waves, in either a PAL-type format, or a SECAM-type format, according to the output standard desired. Where, for example, a PAL-type output is to be provided, the carrier wave input for the remodulator is supplied, as shown in FIG. 2, by the 4.433 MHz. oscillator 19. The modulated color subcarrier signal output of the remodulator apparatus 43 is combined with the combed luminance signal output of combiner 35, and the vertical detail signal output of filter 39, in a signal combiner (not shown in FIG. 2) to form an output composite signal.

Figure 3:
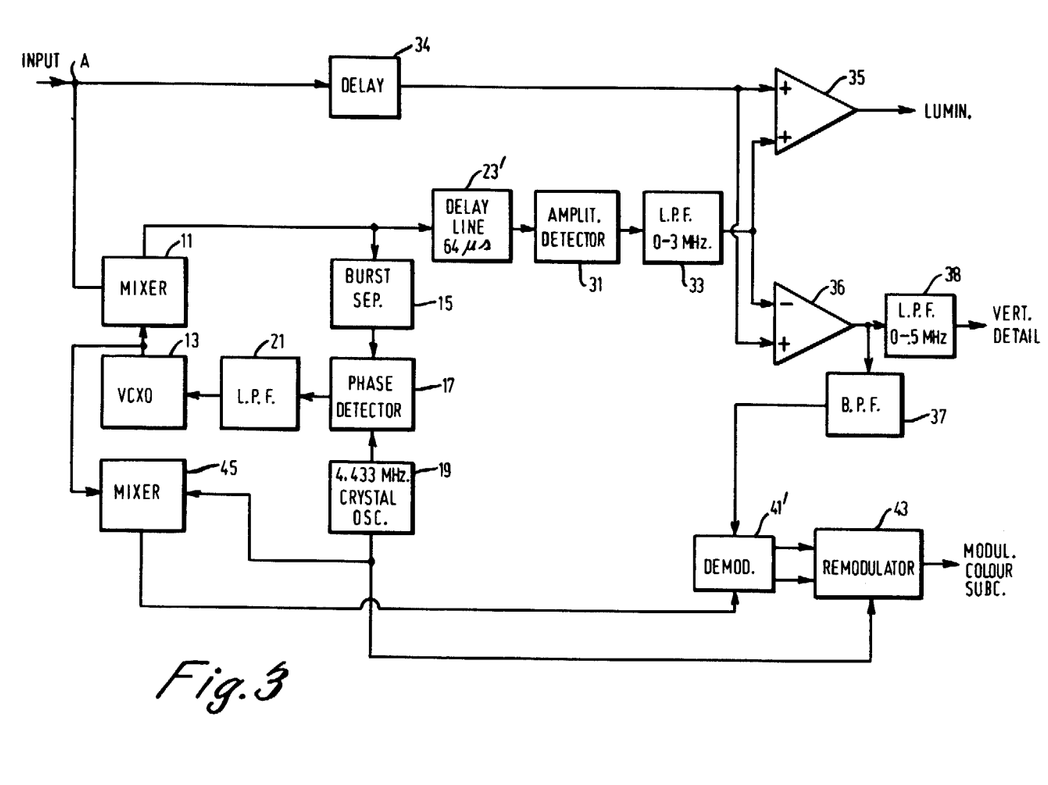

In FIG. 3, a variation of the FIG. 2 arrangement is shown wherein baseband combing is employed to derive both the luminance signal and the modulated color subcarrier signal. The input signal from terminal A is applied to mixer 11, which is also responsive to the output of VCXO 13, as in FIG. 2. The control system for VCXO 13, involving burst separator 15, reference oscillator 19, phase detector 17 and lowpass filter 21, is the same as in FIG. 2, causing development by mixer 11 of the same up-converted signal as previously discussed. The mixer output is applied to a delay line 23', which imparts a delay of 64 microseconds, precisely corresponding to a 1H period (in contrast to the 63.943 microseconds delay of delay line 23 of FIG. 2). The output of delay line 23' is applied (like the output of the additional delay device 29) to amplitude detector 31, with the detector output subject to filtering by lowpass filter 33.

The delayed baseband signal output provided by filter 33 is additively combined with the input signal from terminal A in combiner 35 (as in FIG. 2) to provide combing action of the form effecting rejection of the modulated color subcarrier components, while passing luminance signal components. Additionally, the delayed baseband signal output provided by filter 33 is subtractively combined with the input signal from terminal A in combiner 36 to provide a complementary combing action. Bandpass filter 37, coupled to the output of combiner 36, provides an output signal confined to the bandwidth of the modulated burier subcarrier signal, and freed of the interleaved luminance signal components due to the combing action provided in combiner 36.

The modulated buried subcarrier waves in the output of bandpass filter 37 are applied to demodulator apparatus 41'. A source of demodulating waves for application to demodulator apparatus 41' is provided by a mixer, responsive to the outputs of VCXO 13 and reference oscillator 19, and developing a difference frequency output. The output of mixer 45 (which follows the frequency instabilities of the disc signal) is used in demodulator apparatus 41' to synchronously detect the modulated subcarrier wave output of filter 37 (which output also is subject to the same frequency instabilities) to obtain R-Y and B-Y color difference signals which are substantially free of such frequency instabilities. The recovered color difference signals are supplied to remodulator apparatus 43, as in FIG. 2, for formation of modulated subcarrier waves in the desired output format. Vertical detail information, for "filling in" of a portion of the low frequency band of the luminance signal output of combiner 35, is readily obtained from the output of combiner 36 through the use of lowpass filter 38 coupled thereto.

Figure 4:
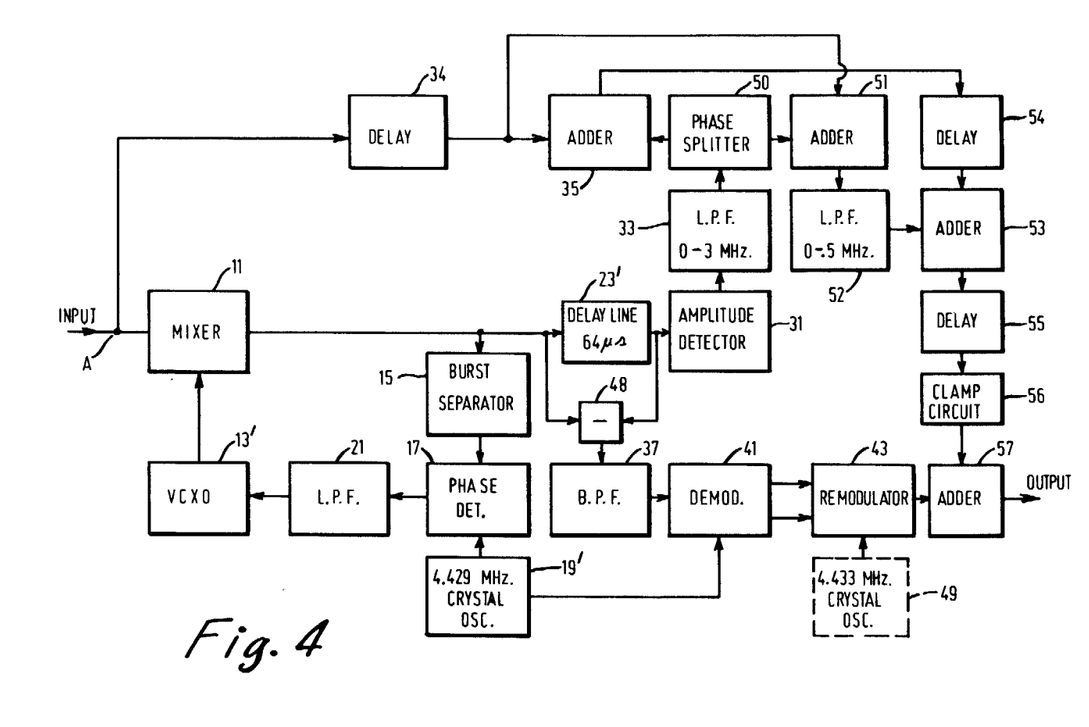

The FIG. 4 arrangement departs from the practice, common to the arrangements of FIGS. 2 and 3, of shifting the buried subcarrier frequency up to the PAL subcarrier frequency. Instead, the up-conversion effected by mixer 11, in the FIG. 4 arrangement, shifts the buried subcarrier frequency to a frequency corresponding to an odd multiple of half the line frequency. An illustrative choice is 4.4296875 MHz. (567 $f_H/2$), which will hereinafter be referred to as 4.429 MHz., for the sake of convenience.

The reference crystal oscillator 19' of the FIG. 4 arrangement operates at the 4.429 MHz. frequency, while the nominal operating frequency of VCXO 13' of the FIG. 4 arrangement corresponds to the sum of the 4.429 MHz. frequency and the buried subcarrier frequency. The input signal from terminal A is mixed in mixer 11 with the output of VCXO 13' to obtain an up-converted signal in which the color subcarrier and its sidebands fall at respective odd multiples of half the line frequency. Control of the VCXO is effected by the filtered output of the phase detector 17 as delivered by lowpass filter 21. The phase detector 17 is responsive to color synchronizing bursts separated from the mixer output by burst separator 15, and to the output of the 4.429 MHz. reference oscillator 19'. The control of VCXO 13' opposes departures from freuqency and phase synchronism between the outputs of separator 15 and oscillator 19', whereby stability of location of the up-converted color subcarrier and its sidebands at the respective odd multiples of half the line frequency is ensured.

The mixer output is applied to the 64 microsecond delay line 23'. The input and the output of delay line 23' are subtractively combined in combiner 48 to form a comb filter passing the up-converted color subcarrier and its sidebands. Bandpass filter 37 confines the output of combiner 48 to the band occupied by the up-converted color subcarrier and its sidebands, and supplies the modulated color subcarrier waves to demodulator apparatus 41 for synchronous detection of the R-Y and B-Y color difference signals (using reference waves derived from oscillator 19'). As in the previously discussed arrangements, the recovered color difference signals are applied to remodulator apparatus 43 for formation of modulated color subcarrier waves in a desired output format. Where a PAL-type output is desired, a carrier wave input for the remodulator is supplied at the PAL subcarrier frequency by an additional crystal oscillator 49.

The output of delay line 23' is applied to amplitude detector 31, and the detector output is filtered by lowpass filter 33. A phase splitter 50, coupled to the output of filter 33, develops a first delayed baseband signal output for additive combination with the input signal from terminal A in combiner 35, and a second delayed baseband signal output (phase inverted relative to the first output) for additive combination with the input signal from terminal A in combiner 51. The phasing of the first output is such that combiner 35 provides a comb filter of the type having rejection notches at odd multiples of half the line frequency, whereby the output of combiner 35 comprises luminance signal components freed from accompaniment by buried color subcarrier components. A complementary comb filter characteristic is provided by combiner 51; lowpass filter 52, coupled to the output of combiner 51, derives a vertical detail signal for ultimate recombination with the luminance signal components present in the output of combiner 35.

A delay device 34 is interposed in the input signal path to combiners 35 and 51 in the FIG. 4 arrangement. The function of the delay device 34 is to compensate for the extra delay introduced in the path of the delay line output to the aforesaid combiners (the extra delay being predominately contributed by lowpass filter 33) so as to ensure that the delay difference for the two paths is of the desired 64 microsecond value. A similar function is served by delay device 34 in the arrangements of FIGS. 2 and 3.

An adder 53 is provided in the FIG. 4 arrangement to add vertical detail information supplied by filter 52 to the luminance signal components passed to the output of combiner 35. A delay device, interposed in the signal path from combiner 35 to adder 53, provides a delay substantially matching the delay associated with lowpass filter 52, so that the respective components of the luminance signals are recombined in adder 53 with proper relative timing.

To form an output composite video signal, an additional adder 57 is shown in FIG. 4 as combining the luminance signal output of adder 53 with the modulated color subcarrier wave output of remodulator apparatus 43. A delay device 56, in the signal path between adder 53 and adder 57, provides additional delay for the luminance signal so that the total luminance signal delay bears a desired relationship to the delay suffered by the color information in the demodulation/remodulation processes. A clamp circuit 56 is interposed between delay device 55 and adder 57 to effect DC restoration for the luminance signal input to adder 57. The arrangement of elements 54, 53, 55, 56 and 57 of FIG. 4 is illustrative of what may be satisfactorily employed for output composite signal formation for the systems of FIGS. 2 and 3, as well.

Figure 5:
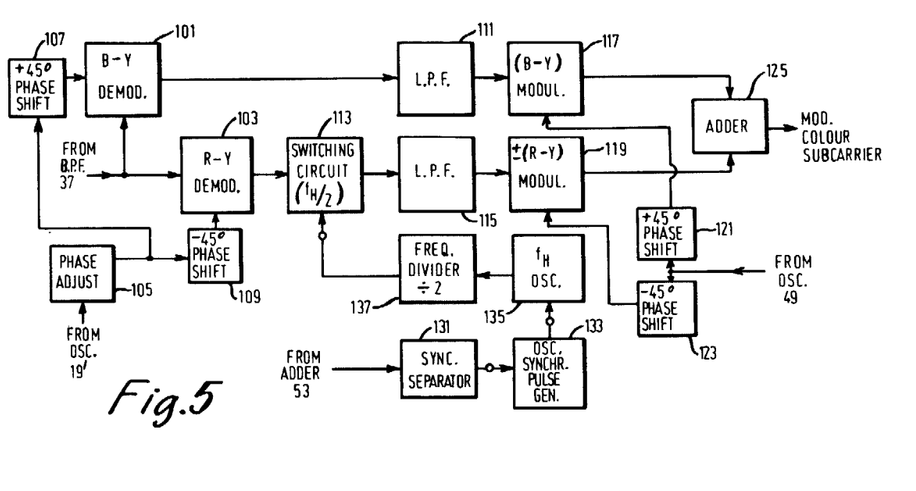
FIG. 5 is a block diagram illustration of specific apparatus which may be advantageously employed in effecting demodulation/remodulation functions in the arrangement of FIG. 4, pursuant to a specific embodiment of the present invention.

FIG. 5 shows a block diagram of one illustrative system for carrying out the demodulation/remodulation functions in the FIG. 4 arrangement in a manner developing a PAL-type output. The modulated color subcarrier wave output of bandpass filter 37 (FIG. 4) is applied to a B-Y demodulator 101, and to an R-Y demodulator 103. Reference waves at 4.429 MHz from crystal oscillator 19' (FIG. 4) are applied via a common phase adjuster 105 to each of a pair of phase shifters 107, 109. Phase shifter 107 introduces a +45° phase shift, while phase shifter 109 introduces a −45° phase shift, whereby the respective phase shifter outputs have a quadrature relationship. The output of phase shifter 107 forms the demodulating wave input for B-Y demodulator 101, while the output of phase shifter 109 forms the demodulating wave input for R-Y demodulator 103.

The common phase adjuster 105 orients the quadrature related phases of the respective demodulating waves so that synchronous detection of the modulated color subcarrier waves occurs at respective +(B-Y) and +(R-Y) phases. A lowpass filter 111 confines the output of demodulator 101 to a +(B-Y) color difference signal product of demodulation. The output of demodulator 103 is supplied to the input of a lowpass filter 115 via a switching circuit 113 which serves to reverse the polarity of the demodulator output during every other line interval under the control switching waves of a $f_H/2$ frequency, supplied to the switching circuit control terminal C. The output of lowpass filter 115 is thus a color difference signal product of demodulation which alternates between +(R-Y) and −(R-Y) form on a line by line basis.

The output of lowpass filter 111 forms the modulating wave input for a B-Y modulator 117, while the output of lowpass filter 115 forms the modulating wave input for a ±R-Y modulator 119. The carrier wave inputs for the respective modulators (each, illustratively, of doubly balanced form) are obtained by application of an output of the PAL subcarrier frequency crystal oscillator 49 (FIG. 4) to respective phase shifters 121, 123. Phase shifter 121 imparts a ±45° phase shift to the carrier wave input for modulator 117, while phase shifter 123 imparts a −45° phase shift to the carrier wave input for modulator 119. The quadrature related color subcarrier component outputs of modulators 117, 119 are combined in adder 125 to develop a modulated color subcarrier wave output for application to the output composite signal forming adder 57 (FIG. 4).

An illustrative arrangement for developing the switching control waves for switching circuit 113 is also shown in FIG. 5. The switching control waves are supplied to terminal C from the output of a frequency divider 137, which halves the output frequency of an oscillator 135. Oscillator 135, which has a free-running frequency that is higher than $f_H$, is entrained to operation at $f_H$ by means of the application to oscillator 135 of line rate pulses derived from the output terminal S of an oscillator synchronizing pulse generator 133. The pulse generator 133 is responsive to horizontal synchronizing pulses separated from the output of luminance signal adder 53 (FIG. 4) by a sync separator 131, and appearing at the sync separator output temrinal H. The synchronization of oscillator 135 is effected in a manner that not only establishes the desired $f_H/2$ rate for the polarity switching action, but also phases the switching so that the same switching state that prevails for the picture signal portion of a given line interval exists for the color synchronizing interval immediately preceding said picture signal portion. Illustratively, for such phasing purposes, the oscillator synchronizing pulse generator 133 takes the form of a 55 microsecond one-shot, triggered by the trailing edges of the separated horizontal synchronizing pulses at terminal H.

It should be noted that the FIG. 5 arrangement automatically effects a conversion of the constant phase color synchronizing bursts of the recorded signal to the "swinging bursts" required in the PAL format. In view of the previously described phasing of the recorded buried subcarrier bursts, the 4.429 MHz. color synchronizing bursts delivered to the demodulators include a burst component at the −(B-Y) phase and a burst component at the +(R-Y) phase. Detected versions of these components appear in the outputs of the respective lowpass filters 111, 115. However, the detected version of the R-Y component is subject to polarity reversal on alternate lines due to the action of switching circuit 113. In the remodulating process, the detected version of the −(B-Y) burst component causes development of a constant phase burst component of PAL subcarrier frequency and −(B-Y) phase in the output of modulator 117, while the alternating polarity detected version of the +(R-Y) burst component causes development of a burst component of PAL subcarrier frequency, shifted +90° from the −(B-Y) phase in alternate line intervals, in the output of modulator 119. When the modulator outputs are summed in adder 125, the summed burst components form a resultant burst shifted +45° in alternate line intervals, as required by the PAL format.

It must be noted that the FIG. 5 arrangement does not assign +(R-Y) and −(R-Y) to specifically numbered lines, as is the case for a standard PAL signal. But, this is immaterial, as far as operation of a PAL color television receiver responding to the output composite signal formed by adder 57 (FIG. 4) is concerned, since the swinging burst component of such composite signal provides identification of the actual sequence employed, and the PAL receiver responds to such identification by following whichever sequence is employed.

Since the line assignments for a particular (R-Y) polarity are not fixed, the previously mentioned use of a burst blanking meander of PAL-type timing in recording signal formation cannot assure that the first and last bursts of all field intervals of the output composite signal will always have a particular selected one of the two possible phase positions. However, such meander use does assure that the first and last bursts of all field intervals of the output composite signal will have the same phase during any given continuous playback period, with the resultant assurance of least disturbance of the PAL television receiver's reference generator by burst blanking during each such operating period.

Figure 6:
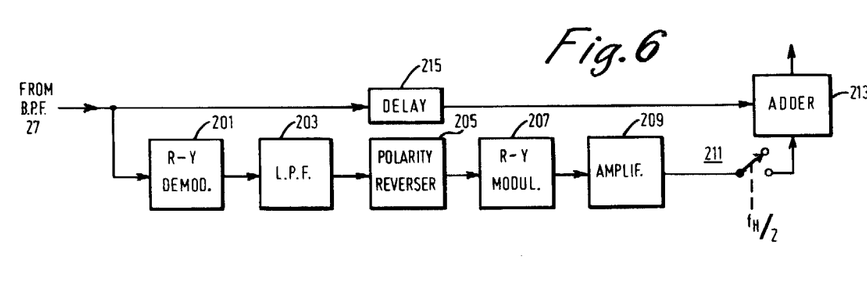
FIG. 6 is a block diagram of alternative demodulation/remodulation apparatus, illustratively applicable to a modification of the arrangement of FIG. 2.

In the arrangements of FIGS. 2, 3 and 4, the subcarrier wave processing involves a demodulation step and a remodulation step for both B-Y and R-Y color difference signals. In FIG. 6, a variation of such subcarrier wave processing is shown which involves demodulation and remodulation steps with respect to only one colordifference signal (i.e., R-Y). In FIG. 6, the modulated color subcarrier wave output of filter 27 (FIG. 2) is applied to an R-Y demodulator 201 for recovery of the R-Y color difference signal, by synchronous detection using a reference wave input from oscillator 19 (FIG. 2). The output of demodulator 201 is filtered by lowpass filter 203, and reversed in polarity by polarity reverser 205. The −(R-Y) signal output of polarity reverser 205 is applied to an R-Y modulator 207, also receiving a carrier wave input from the aforesaid oscillator 19. The modulator output is amplified by amplifier 209 and applied to switching apparatus 211, operating at a $f_H/2$ rate. The switching apparatus applies the output of amplifier 209 to an input of an adder 213 during every other line interval. The output of filter 27 (FIG. 2) is supplied via a delay device 215 to another input of adder 213. The delay provided by delay device 215 substantially matches the delay suffered by R-Y information in the demodulation/remodulation process. The carrier wave phase subject modulation by the −(R-Y) signal in modulator 207 substantially corresponds to the phase occupied by +(R-Y) information in the output signal of delay device 215. The amplification provided by amplifier 209 elevates the amplifier output to a level twice as high as the level of the R-Y component in the output of delay device 215. In view of the above-indicated relationships, the output of adder 213 comprises: (a) during every other line interval (when switch 211 is open), modulated color subcarrier waves undisturbed in composition from the form delivered by filter 27 (and thus containing +(R-Y) information at a first phase position); and (b), during the intervening line intervals (when switch 211 is closed), modulated color subcarrier waves disturbed in composition by the superimposition of the output of amplifier 209 to a form where +(R-Y) information is contained at a second phase position (180° from the first phase position). The output of adder 213 thus is in a PAL format, with line-by-line phase alternation of the R-Y subcarrier component. It will be seen that the periodic superimposition also automatically introduces the desired swing of the synchronizing burst ±45° about the −(B-Y) phase on a line-by-line basis.

What is claimed is:

1. Composite color video signal forming apparatus for use with a source of correlated signals representative of a color image analyzed by a raster scanning process at given line and field frequencies, said signals including a luminance signal, and first and second color-difference signals; said apparatus comprising:

means for developing oscillations of a given frequency substantially corresponding to an odd integral multiple of half said line frequency;

means for modulating an output of said oscillation developing means having a first phase in accordance with said first color-difference signal;

means for modulating an output of said oscillation developing means having a second phase, in quadrature with said first phase, in accordance with said second color-difference signal;

means for combining the outputs of both of said modulating means to develop a signal representative of the chrominance of said color image; and means for causing the formation of a composite color video signal inclusive of said luminance signal, said chrominance signal, and a color synchronizing signal comprising a sequence of recurring bursts of oscillations of said given frequency and of a constant phase differing from said first phase by 45°.

2. Apparatus in accordance with claim 1 wherein the recurrence rate of said bursts corresponds to said line frequency, and wherein said sequence is such that said bursts are blocked from appearance in the formed composite color video signal during a burst blanking period of a width corresponding to a plurality of line intervals, the phasing of said burst blanking period being subject to a predetermined meander relative to successive vertical blanking intervals of the formed composite color video signal.

3. Apparatus in accordance with claim 1 wherein said given frequency is equal to the sum of (1) an odd integral multiple of half said line frequency, and (2) half said field frequency.

4. Color picture information recording apparatus, including composite color video signal forming apparatus in accordance with claim 1, and also including:

means for developing carrier waves varying in frequency in accordance with the amplitude of said formed composite color video signal; and means for utilizing said frequency varying carrier waves to form a record information track comprising a succession of depressions of a periodicity varying in representation of the amplitude of said formed composite color video signal.

5. In playback apparatus for a color picture information record, said playback apparatus including means for recovering from said record composite color video signals including a line synchronizing component of a given line frequency, a luminance signal component occupying a given band of frequencies, and a chrominance component encoded pursuant to a first format and comprising sidebands of a modulated color subcarrier of a first frequency substantially corresponding to a first odd integral multiple of half said given line frequency; transcoding apparatus including:

means, responsive to said recovered composite signals, for developing an up-converted version of said chrominance signal component substantially free from accompaniment by said luminance component; said up-converted version of said chrominance signal component comprising sidebands of a modulated color subcarrier of a second frequency corresponding to the subcarrier frequency of the standard PAL format and differing from an odd integral multiple of half said given line frequency;

a source of reference waves of said second frequency;

synchronous detection means, responsive to said reference waves and said up-converted version of said chrominance signal component, for recovering color-difference signal information;

means, including a modulator responsive to said reference waves and said recovered color-difference signal information, for forming an output chrominance signal component encoded pursuant to a second format different from said first format;

comb filter means for recovering said luminance signal component substantially free from accompaniment by said chrominance component; and means for combining the output of said comb filter means with said output chrominance signal component to form an output composite color video signal.

6. In playback apparatus for a color picture information record, said playback apparatus including means for recovering from said record composite color video signals including a line synchronizing component of a given line frequency, a luminance signal component occupying a given band of frequencies, and a chrominance component encoded pursuant to a first format and comprising sidebands of a modulated color subcarrier of a first frequency remote from the standard PAL color subcarrier frequency and substantially corresponding to a first odd integral multiple of half said given line frequency; transcoding apparatus including:

means for up-converting the frequencies of said recovered composite color video signals to provide up-converted versions of said chrominance and luminance signal components, wherein said up-converted version of said chrominance signal component comprises sidebands of a modulated color subcarrier of a second frequency in the immediate vicinity of said standard PAL color subcarrier frequency but corresponding to a second odd integral multiple of half said given line frequency different from said first odd integral multiple of half said given line frequency;

said up-converting means including a source of oscillations varying in frequency in consonance with the time base errors, if any, of said composite color video signals recovered from said record, and means for heterodyning said recovered composite color video signals with oscillations from said source in such manner that said up-converted chrominance signal component is substantially free of time base errors;

comb filter means, including a delay line responsive to the output of said up-converting means, for subjecting the output of said up-converting means to a frequency response characteristic exhibiting a plurality of rejection notches in the vicinity of respective even integral multiples of half said line frequency;

means, responsive to the output of said comb filter means, for recovering said up-converted version of said chrominance signal component to the substantial exclusion of said luminance component;

synchronous detection means, responsive to said recovered up-converted version of said chrominance signal component, for recovering color-difference signal information therefrom;

means, including a modulator responsive to said recovered color-difference signal information, for forming an output chrominance signal component encoded pursuant to a second format different from said first format;

additional comb filter means, also including said delay line, for recovering said luminance signal component substantially free from accompaniment by said chrominance component; and means for combining the output of said additional comb filter means with said output chrominance signal component to form an output composite color video signal.

7. Apparatus in accordance with claim 6 wherein said synchronous detection means includes a first synchronous detector, responsive to said recovered up-converted version of said chrominance signal and to reference waves of said second frequency and of a first phase, for recovering a first color-difference signal; and a second synchronous detector, responsive to said recovered up-converted version of said chrominance signal and to reference waves of said second frequency and of a second phase, for recovering a second color-difference signal.

8. Apparatus in accordance with claim 7 wherein said second format is a PAL format, and wherein said output chrominance signal component forming means includes a pair of modulators, responsive respectively to the outputs of different ones of said synchronous detectors, and to carrier waves of PAL subcarrier frequency of respectively different phases.

9. In playback apparatus for a color picture information record, said playback apparatus including means for recovering from said record composite color video signals including a line synchronizing component of a given line frequency, a luminance signal component occupying a given band of frequencies, and a chrominance component encoded pursuant to a first format and comprising sidebands of a modulated color subcarrier of a first frequency substantially corresponding to a first odd integral multiple of half said given line frequency; transcoding apparatus including:

means for up-converting the frequencies of said recovered composite color video signals;

comb filter means, including a delay line responsive to the output of said up-converting means, for subjecting the output of said up-converting means to a frequency response characteristic exhibiting a plurality of rejection notches in the vicinity of respective even integral multiples of half said line frequency;

means, responsive to the output of said comb filter means, for recovering an up-converted version of said chrominance signal component to the substantial exclusion of said luminance component;

synchronous detection means, responsive to said up-converted version of said chrominance signal component, for recovering color-difference signal information therefrom;

means, including a modulator responsive to said recovered color-difference signal information, for forming an output chrominance signal component encoded pursuant to a second format different from said first format;

additional comb filter means, also including said delay line, for recovering said luminance signal component substantially free from accompaniment by said chrominance component; and means for combining the output of said additional comb filter means with said output chrominance signal component to form an output composite color video signal;

wherein said second format is a PAL format, and wherein said up-converted version of said chrominance signal comprises sidebands of a modulated color subcarrier of PAL subcarrier frequency.

10. Apparatus in accordance with claim 9 wherein said synchronous detection means and said output chrominance signal component forming means are both responsive to carrier waves of PAL subcarrier frequency.

11. Apparatus in accordance with claim 9 wherein said output chrominance signal component forming means includes means for combining the output of said modulator with said up-converted version of said chrominance signal during alternate line intervals.

12. Apparatus in accordance with claim 5 wherein said means for developing said up-converted version of said chrominance signal component includes:
a voltage controlled oscillator;
heterodyning means responsive to said recovered composite color video signals and to an output of said voltage controlled oscillator;
a phase detector, responsive to an output of said heterodyning means and to reference waves from said source, for developing a control voltage; and
means for utilizing said control voltage to control the output frequency of said voltage controlled oscillator.

13. Apparatus in accordance with claim 12 wherein said developing means also includes:
additional comb filter means, including a delay line responsive to an output of said heterodyning means, for subjecting said output of said heterodyning means to a frequency response charactersitic exhibiting a plurality of rejection notches in the vicinity of respective even integral multiples of half said line frequency.

14. Color picture information recording apparatus including:
a source of signals occupying a given band of frequencies and representative of the luminance of an image analyzed by a raster scanning process at given line and field frequencies;
means for developing a chrominance signal component representative of the chrominance of said image and an accompanying color synchronizing component; said chrominance signal component comprising modulated color subcarrier waves occupying an intermediate portion of said given band of frequencies, with said subcarrier frequency being substantially equal to the sum of an odd integral multiple of half said line frequency, and half said field frequency; said modulated color subcarrier waves corresponding to the sum of (a) color subcarrier waves of said subcarrier frequency and of a first phase, modulated by a first color-difference signal, and (b) color subcarrier waves of said subcarrier frequency and of a second phase, in quadrature with said first phase, modulated by a second color-difference signal; said accompanying color synchronizing component comprising periodic bursts of oscillations of said subcarrier frequency and of a constant phase differing from said first phase by 45°;

means, coupled to said source and to said developing means, for forming composite color video signals inclusive of said luminance-representative signals, said chrominance signal component and said accompanying color synchronizing component;

means for developing carrier waves varying in frequency in accordance with the amplitude of said formed composite color video signals; and means for utilizing said frequency varying carrier waves to form a record information track comprising a succession of depressions of a periodicity varying in representation of the amplitude of said formed composite color video signal.

15. In playback apparatus for a color picture information record, said playback apparatus including means for recovering from said record composite color video signals including a line synchronizing component of a given line frequency, a luminance signal component occupying a given band of frequencies, a chrominance signal component encoded pursuant to a first format and occupying an intermediate portion of said given band, and a color synchronizing component; said chrominance signal component comprising modulated color subcarrier waves of a first subcarrier frequency, with said first subcarrier frequency corresponding to an odd integral multiple of half said given line frequency; said modulated color subcarrier waves corresponding to the sum of (a) color subcarrier waves of said subcarrier frequency and of a first phase, modulated by a first color-difference signal, and (b) color subcarrier waves of said subcarrier frequency and of a second phase, in quadrature with said first phase, modulated by a second color-difference signal; said accompanying color synchronizing component comprising periodic bursts of oscillations of said subcarrier frequency and of a constant phase differing from said first phase by 45°; transcoding apparatus including:

means, responsive to said recovered composite signals, for developing up-converted versions of said chrominance signal and color synchronizing components substantially free from accompaniment by said luminance component; said up-converted version of said chrominance signal component comprising modulated color subcarrier waves of a second subcarrier frequency corresponding to the subcarrier frequency of the standard PAL format, and said up-converted version of said color synchronizing component comprising periodic bursts of oscillations of said second frequency and of constant phase;

a source of reference waves of said second frequency;

first synchronous detection means, responsive to reference waves from said source and to said up-converted versions of said chrominance signal and color synchronizing components, for recovering a first color-difference signal and an accompanying burst-representative pulse;

second synchronous detection means, responsive to reference waves from said source and to said up-converted versions of said chrominance signal and color synchronizing components, for recovering a second color-difference signal and an accompanying burst-representative pulse;

remodulation means, responsive to reference waves from said source and to said recovered color-difference signals and accompanying pulses, for forming an output chrominance signal component encoded pursuant to a second format different from said first format and an output color synchronizing component; said output chrominance signal component comprising modulated color subcarrier waves corresponding to the sum of (c) color subcarrier waves of said second frequency and of a first output phase, modulated by said first color-difference signal, and (d) color subcarrier waves of said second frequency and of a second output phase, in quadrature to said first output phase, modulated by said second color difference signal in one polarity during alternate line intervals and in the opposite polarity during the intervening line intervals; and said output color synchronizing component comprising bursts of said second frequency and of a phase alternating between a phase leading said first output phase by 135° and a phase lagging said first output phase by 135°;

comb filter means, for recovering said luminance signal component substantially free from accompaniment by said chrominance component; and means for combining the output of said comb filter means with said output chrominance signal component and said output color synchronizing component to form an output composite color video signal.

* * * * *